United States Patent
Xu

(10) Patent No.: US 10,766,555 B1
(45) Date of Patent: Sep. 8, 2020

(54) BRAKE WARNING DEVICE MOUNTED ON A BICYCLE OR MOTORCYCLE HANDLE

(71) Applicant: MEIZHOU FRII LENS ELECTRONIC TECHNOLOGY CO., LTD., Meizhou (CN)

(72) Inventor: Daozheng Xu, Meizhou (CN)

(73) Assignee: MEIZHOU FRII LENS ELECTRONIC TECHNOLOGY CO., LTD., Meizhou (CN)

( * ) Notice: Subject to any disclaimer, the term of this patent is extended or adjusted under 35 U.S.C. 154(b) by 0 days.

(21) Appl. No.: 16/581,875

(22) Filed: Sep. 25, 2019

(51) Int. Cl.
  *B62J 6/04* (2020.01)
  *B62L 3/02* (2006.01)

(52) U.S. Cl.
  CPC .. *B62J 6/04* (2013.01); *B62L 3/02* (2013.01)

(58) Field of Classification Search
  CPC ..................................... B62J 6/04; B62L 3/02
  See application file for complete search history.

(56) References Cited

U.S. PATENT DOCUMENTS

| 9,272,662 | B2 * | 3/2016 | Hsu ...................... B60Q 1/2615 |
| 9,592,870 | B2 * | 3/2017 | Hsu ........................... B62J 6/04 |
| 2019/0367131 | A1 * | 12/2019 | Marangon ................ B62H 5/00 |

* cited by examiner

*Primary Examiner* — Kevin Quarterman
(74) *Attorney, Agent, or Firm* — Law Offices of Steven W. Weinrieb

(57) ABSTRACT

The present invention discloses a brake warning device mounted between a bicycle handle and a brake horn, the brake warning device includes a moving portion, a fixing portion, a sensory switch and a tip light, the moving portion of the brake warning device includes a first thimble fixing block, a second thimble fixing block, a first thimble, a thimble spring, a second thimble, and a protective outer spring, the first thimble fixing block and the second thimble fixing block are embedded to form one and connected to the brake horn, the fixing portion of the brake warning device includes a first fixing block and a second fixing block, the first fixing block and the second fixing block are assembled to form a loop structure, which can be mounted on the handle, the sensory switch is located on the first fixing block, the second thimble passes through the first fixing block and is in contact with the sensory switch. The display of multiple brake light signals changes from one point to a three-dimensional surface, which serves as a clear reminder and improves the safety of the rider.

4 Claims, 3 Drawing Sheets

BRAKE WARNING DEVICE MOUNTED ON A BICYCLE OR MOTORCYCLE HANDLE

CROSS REFERENCE TO RELATED APPLICATIONS

This application claims priority to the following Patent Application: Chinese patent application CN201910724013.6, filed at Aug. 7, 2019, the above-identified application is hereby incorporated by reference in its entirety as if fully set forth herein.

FIELD OF THE INVENTION

The present invention relates to the technical field of manufacturing of accessory product of bicycles, tricycles and motorcycles, and in particular, relates to a brake warning device mounted on a bicycle or a motorcycle handle.

BACKGROUND OF THE INVENTION

In vehicles and the densely populated areas of urban road, for example, bicycles, electric bicycles, tricycles or a motorcycles are shuttled, which lack a highly recognizable safety indicator, at the same time, when the above vehicles are used, it is difficult for the rear vehicle to clearly understand the braking intention of the bicycle, electric bicycle, tricycle or a motorcycle in front, it is difficult to grasp the brake condition of the user immediately, which is likely to cause a rear-end collision of the rear vehicle, at the same time, in vehicles and the densely populated areas of existing urban road there are no obvious tip lights on the bicycles and electric bicycles that are riding, which is not safe enough, to this end, it is proposed that a brake warning device, which is safe and reliable, can know the intention of using the brake in real time, this is the idea of the present invention.

Overall Objective of the Invention

The object of the present invention is to provide a brake warning device which is safe and reliable and can know the intention of using the brake in real time, it is used to enhance the intention of the rear vehicle personnel to know the braking situation of the vehicle in front, take timely measures to brake in time to avoid rear-end collisions.

SUMMARY OF THE INVENTION

In order to achieve the above object, the present invention provides the following technical solution: a brake warning device mounted between a bicycle handle and a brake horn, the brake warning device includes a moving portion, a fixing portion, a sensory switch, and a tip light, the moving portion of the brake warning device includes a first thimble fixing block, a second thimble fixing block, a first thimble, a thimble spring, a second thimble, and a protective outer spring, the first thimble fixing block and the second thimble fixing block are embedded to form one and connected to the brake horn, the fixing portion of the brake warning device includes a first fixing block and a second fixing block, the first fixing block and the second fixing block are assembled to form a loop structure, which can be mounted on the handle, the sensory switch is located on the first fixing block, the second thimble passes through the first fixing block and is in contact with the sensory switch, the second thimble of the moving portion of the brake warning device is touched by the brake horn to trigger the sensory switch to make the tip light mounted on the rear of the bicycle work or not.

A wireless signal transmitter is disposed in the sensory switch, a wireless signal receiver is disposed in the tip light, a wireless communication connection is made between the sensory switch and the tip light, both the wireless signal transmitter and the wireless signal receiver can be purchased on the market, and a detailed description thereof will not be given here.

The tip light includes a first brake light, a second brake light, a third brake light, a fourth brake light, and a fifth brake light, the first brake light is mounted on a safety helmet, the second brake light is embedded in the clothes jacket, the third brake light is embedded in a carrying waist pocket, the fourth brake light is mounted on a bicycle frame on the lower side of the cushion, the fifth brake light is mounted on the surface of a rear suitcase.

Preferably, inside the first brake light, the second brake light, the third brake light, the fourth brake light, and the fifth brake light are all included a wireless receiving chip device of the MTUN model.

Preferably, the first thimble fixing block and the second thimble fixing block are located outside the brake horn and stably mounted thereon, the first fixing block and the second fixing block are located outside the handle and stably mounted thereon.

Preferably, the handle can be provided with a meter, a wireless transmitter is disposed in the meter, a sixth brake light is disposed on the bicycle frame on the upper side of a rear wheel, the sixth brake light and the brake warning device are connected by wire.

Preferably, a turn light is provided at the bottom of the two sides of the handle.

Compared with the prior art, the present invention has the beneficial effects that when the rider holds the brake horn to brake while riding, the force of the braking action acts on the brake horn, and the thimble moves and touches the sensory switch, thereby transmitting a wireless signal to the wireless receiving chip included in the tip light, the tip light is lit, the display of multiple brake light signals changes from one point to a three-dimensional surface, which serves as a clear reminder and improves the safety of the rider.

At the same time, the present invention is a matching accessory product for bicycles, electric bicycles, tricycles and motorcycles, and can be mounted between the handle and the brake horn immediately. There is no need to modify vehicles such as bicycles or to make other power connections, there are no security risks, and consumers will be more humanized.

DETAILED DESCRIPTION OF THE ILLUSTRATED EMBODIMENTS

Figure 1:
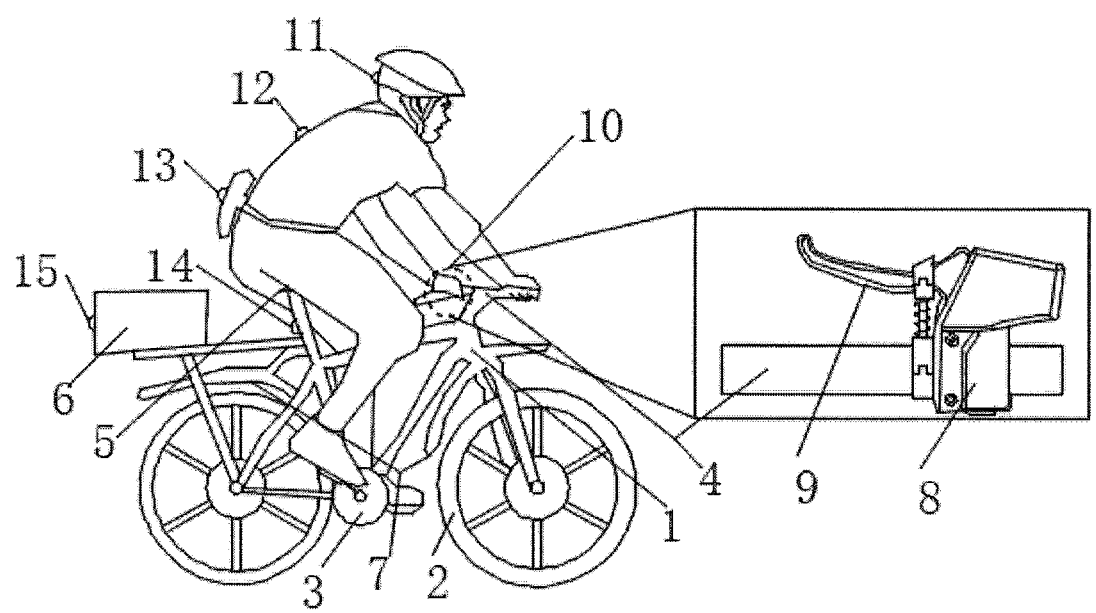
FIG. 1 is a schematic view of the structure of the present invention.

The reference numbers in the drawings are noted sequentially as follows:

1 is a bicycle frame;
2 is a wheel;
3 is a sprocket;
4 is a handle;
5 is a cushion;
6 is a rear suitcase;
7 is a hood;
8 is a brake handle;
9 is a brake horn;
10 is a brake warning device;
11 is a first brake light;
12 is a second brake light;
13 is a third brake light;
14 is a fourth brake light;
15 is a fifth brake light;
20 is a first thimble fixing block;
21 is a second thimble fixing block;
22 is a first thimble;
23 is a thimble spring;
24 is a second thimble;
25 is a protective outer spring;
26 is a first fixing block;
27 is a second fixing block;
28 is a sensory switch;
31 is a sixth brake light;
32 is a wireless signal transmitter; and
50 is a tip light.

The technical solutions in the embodiments of the present invention are clearly and completely described in the following with reference to the accompanying drawings in the embodiments of the present invention. It is apparent that the described embodiments are only a part of the embodiments of the invention, and not all of the embodiments. All other embodiments obtained by those skilled in the art based on the embodiments of the present invention without creative efforts are within the scope of the present invention.

Figure 2:
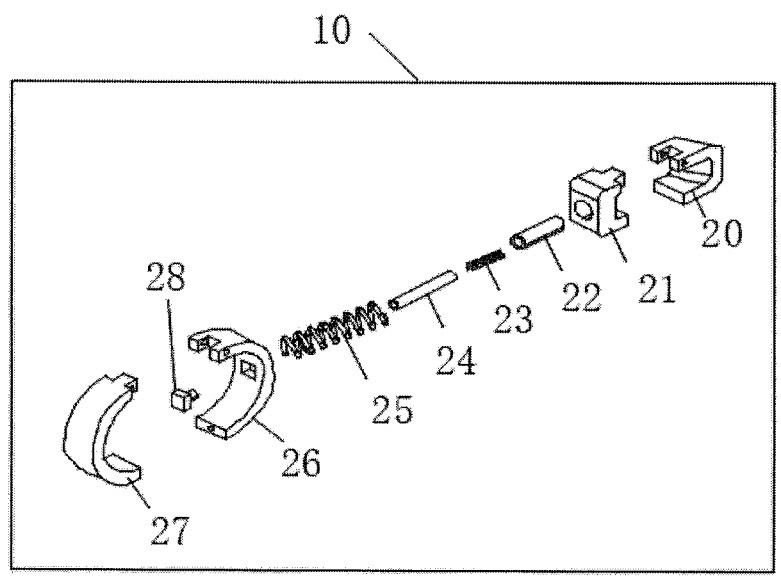
FIG. 2 is a schematic view of structure of the brake linkage device of the present invention.
Figure 3:
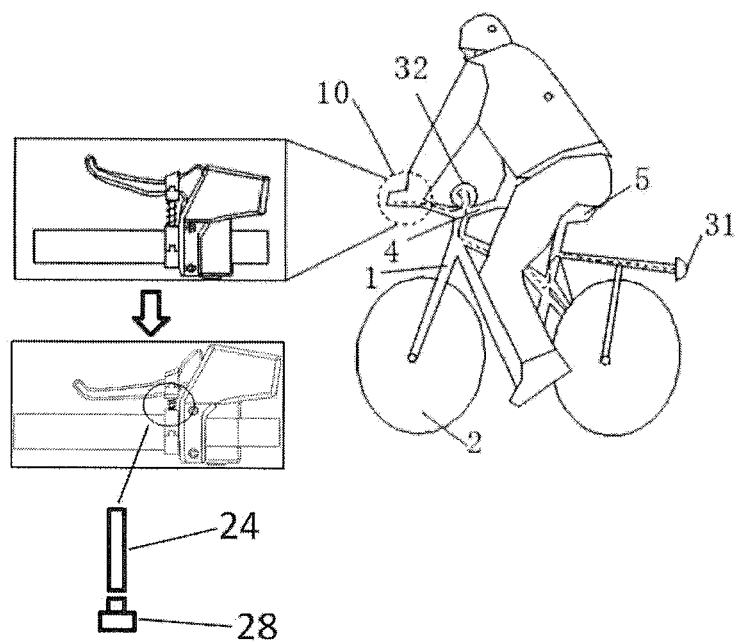
FIG. 3 is a schematic view of the wired connection structure of the brake linkage device of the present invention.
Figure 4:
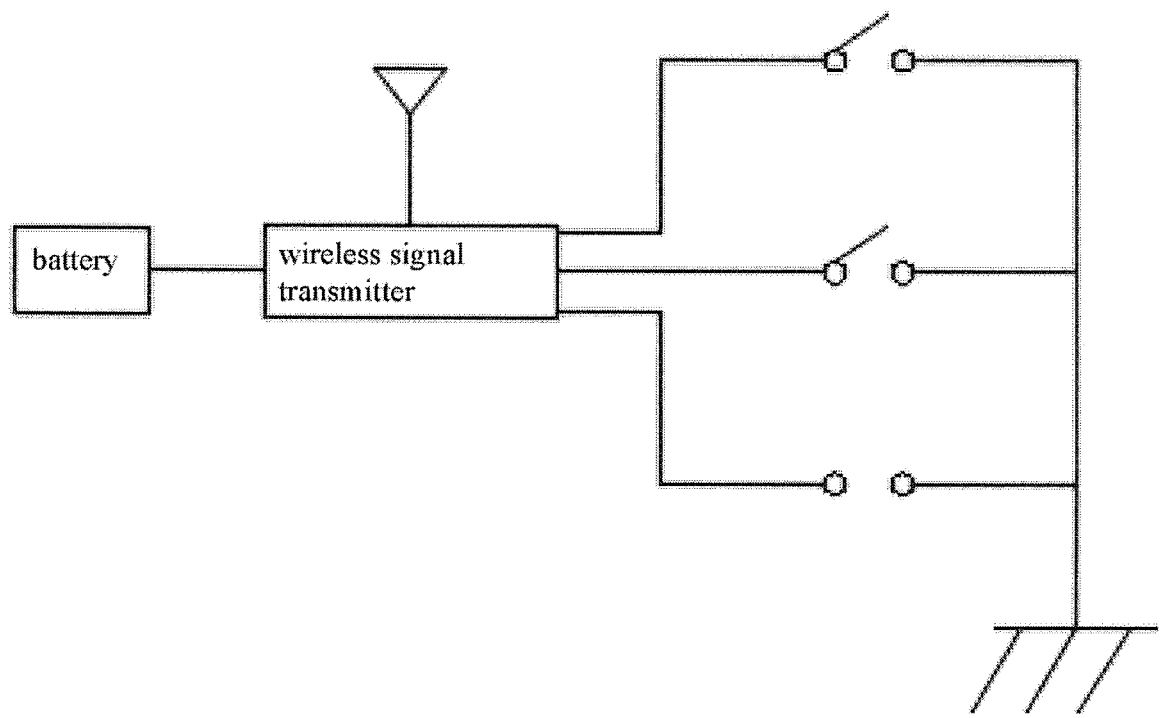
FIG. 4 is a circuit block diagram of the wireless transmitter of the present invention.
Figure 5:
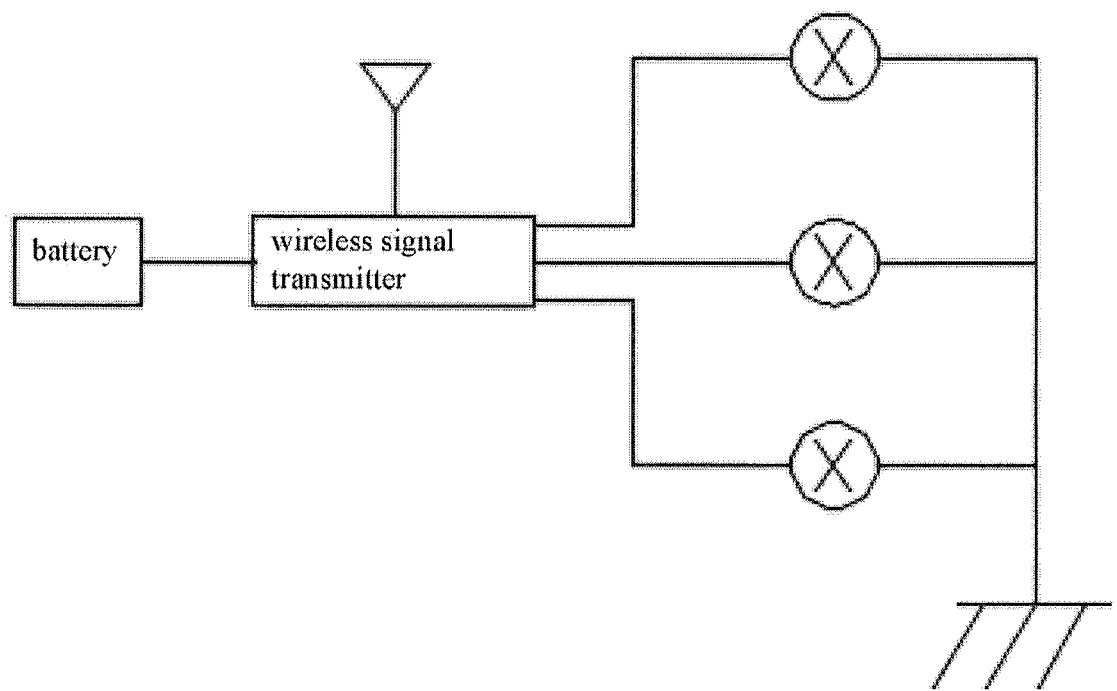
FIG. 5 is a schematic view of the structure of the circuit flow of the tip light of the present invention.

Referring to FIG. 1 to FIG. 5, the present invention provides the following technical solution: a brake warning device mounted on a bicycle or a motorcycle handle includes: a brake warning device 10 mounted between the handle 4 and a brake horn 9 of the bicycle, the bicycle includes a bicycle frame 1, a wheel 2, a sprocket 3, a handle 4, a cushion 5, a rear suitcase 6, a hood 7, a brake handle 8, and a brake horn 9, the brake warning device 10 includes a moving portion, a fixing portion, a sensory switch 28, and a tip light 50, the moving portion of the brake warning device 10 includes a first thimble fixing block 20, a second thimble fixing block 21, a first thimble 22, a thimble spring 23, and a second thimble 24, the fixing portion of the brake warning device 10 includes a first fixing block 26 and a second fixing block 27, the sensory switch 28 is located on the first fixing block 26, the tip light 50 includes a first brake light 11, a second brake light 12, a third brake light 13, a fourth brake light 14, and a fifth brake light 15.

In this embodiment, the first brake light 11 is mounted on the safety helmet, the second brake light 12 is embedded in the clothes jacket, and the third brake light 13 is embedded in a carrying waist pocket.

In this embodiment, the fourth brake light 14 is mounted on a bicycle frame 1 on the lower side of the cushion 5; the fifth brake light 15 is mounted on the surface of a rear suitcase 6.

In this embodiment, inside the first brake light 11, the second brake light 12, the third brake light 13, the fourth brake light 14, and the fifth brake light 15 are all included a wireless receiving chip device of the MTUN model.

In this embodiment, the first thimble fixing block 20 and the second thimble fixing block 21 are located outside the brake horn 9, the first fixing block 26 and the second fixing block 27 are located outside the handle 4, the second thimble 24 is located between the second thimble fixing block 21 and the first fixing block 26, the protective outer spring 25 is set on the outside of the second thimble 24.

In this embodiment, the handle 4 is provide with a meter, a wireless signal transmitter 32 is set in the meter, a sixth brake light 31 is disposed on the bicycle frame 1 on the upper side of a rear wheel 2, the sixth brake light 31 and the brake warning device 10 are connected by wire.

In this embodiment, a turn light is provided at the bottom of the two sides of the handle 4.

The brake warning device 10 of the present invention can be applied to any bicycle, motorcycle and tricycle, and the principle is the same. The working principle and the use process of the present invention is that when the rider holds the brake horn 9 to brake while riding, the force of the braking action acts on the brake horn 9, and the brake horn 9 will drive the first thimble fixing block 20 and the second thimble fixing block 21 of the thimble to move up and down, the second thimble 24 moves and touches the sensory switch 28, thereby transmitting a wireless signal to the wireless receiving chip included in the tip light 50, and the tip light 50 is lit, the display of multiple brake light signals changes from one point to a three-dimensional surface, which serves as a clear reminder and improves the safety of the rider, thereby avoiding rear-end collisions.

Although the embodiments of the present invention have been shown and described above, a person skilled in the art will understand that various changes, modifications, alterations and variations can be made to the embodiments without departing from the principle and the spirit of the present invention, and the scope of the present invention is defined by the appended claims and their equivalents.

What is claimed is:

1. A brake warning device mounted on a bicycle or a motorcycle handle, including a brake warning device (10) mounted between the handle (4) and a brake horn (9) of the bicycle and a tip light (50), characterized in that:
   the brake warning device (10) includes a moving portion, a fixing portion, and a sensory switch (28),
   the moving portion of the brake warning device (10) includes a first thimble fixing block (20), a second thimble fixing block (21), a first thimble (22), a thimble spring (23), a second thimble (24), and a protective outer spring (25),
   the first thimble fixing block (20) and the second thimble fixing block (21) are embedded to form one and connected to the brake horn (9),
   the fixing portion of the brake warning device (10) includes a first fixing block (26) and a second fixing block (27),
   the first fixing block (26) and the second fixing block (27) are assembled to form a loop structure, which can be mounted on the handle (4),
   the sensory switch (28) is located on the first fixing block (26); and
   the second thimble (24) passes through the first fixing block (26) and is in contact with the sensory switch (28).

2. The brake warning device mounted on a bicycle or a motorcycle handle of claim 1, characterized in that:
   a wireless signal transmitter (32) is disposed in the sensory switch (28), a wireless signal receiver is disposed in the tip light (50); and a wireless communication connection is made between the sensory switch (28) and the tip light (50).

3. The brake warning device mounted on a bicycle or a motorcycle handle of claim 1, characterized in that:

the tip light (50) includes a first brake light (11), a second brake light (12), a third brake light (13), a fourth brake light (14), and a fifth brake light (15), the first brake light (11) is mounted on a safety helmet, the second brake light (12) is embedded in the clothes jacket, the third brake light (13) is embedded in a carrying waist pocket, the fourth brake light (14) is mounted on a bicycle frame (1) on the lower side of the cushion (5); and the fifth brake light (15) is mounted on the surface of a rear suitcase (6).

4. The brake warning device mounted on a bicycle or a motorcycle handle of claim 1, characterized in that:

a sixth brake light (31) is disposed on the bicycle frame (1) on the upper side of a rear wheel (2), the second thimble (24) of the moving portion of the brake warning device (10) is touched by the brake horn (9) to trigger the sensory switch (28) to make the tip light (50) mounted on the rear of the bicycle work or not.

* * * * *